J. A. BRIED.
MEANS FOR ATTACHING REVOLVING BODIES TO SHAFTS.
APPLICATION FILED JULY 24, 1915.
1,174,543.
Patented Mar. 7, 1916.
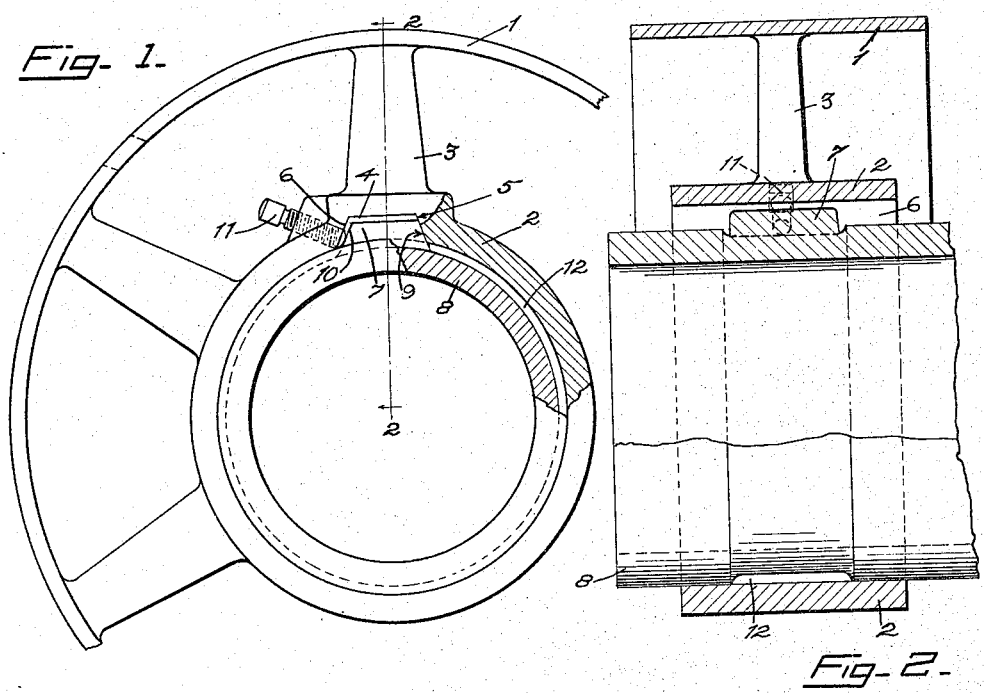

UNITED STATES PATENT OFFICE.

JULIEN A. BRIED, OF OAKLAND, CALIFORNIA.

MEANS FOR ATTACHING REVOLVING BODIES TO SHAFTS.

1,174,543.  Specification of Letters Patent.  Patented Mar. 7, 1916.

Application filed July 24, 1915. Serial No. 41,676.

*To all whom it may concern:*

Be it known that I, JULIEN A. BRIED, a citizen of the United States, residing at Oakland, in the county of Alameda and State of California, have invented certain new and useful Improvements in Means for Attaching Revolving Bodies to Shafts, of which the following is a specification.

The hereinafter described invention relates to improvements in attaching pulleys, sprocket wheels and the like to shafts or sleeves, but principally that type of sleeve which is found on friction clutches and the like and which rotates on a supporting shaft, and has for its principal objects, to dispense with the usual set screws which pass through the pulley hub and engage or are forced against the sleeve body at right angles to its axis for maintaining the hub in locked position, and to provide a surface on the collar arranged at an angle to the face thereof and against which surface the end of an adjusting screw impinges, and which passes through the hub at an angle to the outer surface thereof.

The present invention enables the pulley hub to be easily and quickly secured to the sleeve and in such a manner that play between the various parts is prevented, and permits the maintaining of a tight joint and enables the structure to be manufactured at little cost, obviating the present necessity of fitting of keys in keyways and overcoming the present objection of set screws of marring the sleeve, and increasing the driving power of set screws by making them exert their pressure more in line with the transmission effort.

The invention consists in providing a surface on the sleeve and arranged at an angle to the rotation of said sleeve and against which is forced a member passing through the hub at approximately right angles to the said face, and the adjustment of which causes another surface carried by the sleeve to engage against a surface or member carried by the hub.

With the above mentioned and other objects in view, the invention consists in the novel construction and combination of parts hereinafter described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

Figure 1 is a view in side elevation, partly in section, disclosing an embodiment of my invention in position and mounting a pulley on a sleeve. Fig. 2 is a sectional view taken on line 2—2 of Fig. 1.

Referring more particularly to the drawings wherein like characters of reference designate corresponding parts throughout the several views—1 represents the rim of a pulley supported on a suitable tubular hub 2 by the spokes 3. A transverse channel or groove is formed in the inner face of the hub, preferably beneath a spoke 3, and the same is provided with oppositely disposed side faces 5 and 6, arranged in a plane preferably parallel with the axis of rotation of the pulley and converging outwardly.

A projection 7 formed on the periphery of the shaft or tubular sleeve or shell 8, which is positioned in the hub 2, is received in the channel 4 and the side faces 9 and 10 of said projection are disposed in the same planes as their respective coöperating faces 5 and 6 of channel 4.

A set screw 11 passes through the hub 2 and the inner end thereof projects from the side face 6 of the channel 4, and when forced inwardly abuts against the face 10 of the lug and adjusts the pulley and collar relatively to each other, so that the face 5 of the groove 4, and the face 9 of the lug 7 are in contact. The faces 5 and 9 are so arranged relatively to the rotation of the pulley that the torque is received thereby. In the sleeve, which is preferably of cast metal, a circumferential groove 12 is formed on the surface thereof, of the width of the lug 7, and said groove dispenses with the grinding or finishing of the surface of the sleeve portions circumferentially in the path of the lug.

In the device disclosed, it will be apparent that by adjusting the set screw the sleeve and pulley may be quickly assembled or separated and that any lost motion or wear may be easily overcome. In the improved construction, the fitted machine keys now commonly in use and likewise the set screws which pass through the hub at right angles to the surface thereof and seat on the sleeve or shaft and which shear off or break under the strain, are dispensed with, and the strain or torque is directly against a surface on the collar disposed at an angle to the rotation thereof and against a screw placed at an angle to directly resist the transmission effort.

In the structure there is provided a portion on the sleeve having oppositely disposed surfaces and the adjustment of a screw extended through the hub of the pulley contacts with one surface and forces the other surface in contact with a limiting means or stop also carried by the hub of the pulley. In this construction the pulley may be secured on a shaft.

Having thus described my invention, what I claim is:—

In combination, a member having a tubular hub formed on its inner surface with a groove having side faces extending parallel with the axis of rotation of said member and converging outwardly, a member for reception in said hub and formed with a lug for reception in said groove, the side faces of said lug being disposed in planes parallel to the faces of said groove, and an adjusting member extending through the hub of said first named member and engaging one of the side faces of said lug to force the opposite coöperating faces of said lug and groove into contact.

In testimony whereof I have signed my name to this specification in the presence of the subscribing witness.

JULIEN A. BRIED

Witness:
D. B. RICHARDS.

Copies of this patent may be obtained for five cents each, by addressing the "Commissioner of Patents, Washington, D. C."